United States Patent
Pardo et al.

(10) Patent No.: US 10,914,179 B2
(45) Date of Patent: Feb. 9, 2021

(54) HIGH-PRESSURE DISTRIBUTOR BLADING HAVING A VARIABLE-GEOMETRY INSERT

(71) Applicant: Safran Helicopter Engines, Bordes (FR)

(72) Inventors: Frederic Philippe Jean-Jacques Pardo, Moissy-Cramayel (FR); Guilhem Verron, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 81 days.

(21) Appl. No.: 15/746,363

(22) PCT Filed: Jul. 20, 2016

(86) PCT No.: PCT/FR2016/051866
§ 371 (c)(1),
(2) Date: Jan. 19, 2018

(87) PCT Pub. No.: WO2017/013354
PCT Pub. Date: Jan. 26, 2017

(65) Prior Publication Data
US 2018/0216476 A1     Aug. 2, 2018

(30) Foreign Application Priority Data

Jul. 20, 2015 (FR) .................... 15 56860

(51) Int. Cl.
| | |
|---|---|
| *F01D 5/18* | (2006.01) |
| *F01D 9/04* | (2006.01) |
| *F01D 9/02* | (2006.01) |

(52) U.S. Cl.
CPC .............. *F01D 5/189* (2013.01); *F01D 9/02* (2013.01); *F01D 9/041* (2013.01);
(Continued)

(58) Field of Classification Search
CPC . F01D 5/18; F01D 5/187; F01D 5/188; F01D 5/189; F01D 9/02; F01D 9/04;
(Continued)

(56) References Cited

U.S. PATENT DOCUMENTS

| | | | | |
|---|---|---|---|---|
| 3,844,343 A | * | 10/1974 | Burggraf | ................. F01D 11/08 165/109.1 |
| 6,318,963 B1 | * | 11/2001 | Emery | .................... F01D 5/186 416/96 A |

(Continued)

FOREIGN PATENT DOCUMENTS

| | | |
|---|---|---|
| EP | 0919698 A1 | 6/1999 |
| EP | 1284338 A2 | 2/2003 |

(Continued)

OTHER PUBLICATIONS

Preliminary Research Report and Written Opinion received for French Application No. 1556860, dated Jun. 14, 2016, 7 pages (1 page of French Translation Cover Sheet and 6 page of original document).

(Continued)

*Primary Examiner* — Igor Kershteyn
*Assistant Examiner* — Elton K Wong
(74) *Attorney, Agent, or Firm* — Womble Bond Dickinson (US) LLP

(57) ABSTRACT

The invention relates to distributor blading (10) having a blade (12), including a pressure-side wall (16) and a suction-side wall (14), and an insert (20) placed in the blade (12) and including: a closed wall (22) having an outer skin (24) extending opposite the pressure-side walls (16) and suction-side walls (14), the outer skin (24) and the wall of the facing blade (12) being separated by an air gap (30), a series of reinforcements (25) formed in the closed wall (22) and leading into the outer skin (24), and a series of through- (Continued)

openings formed in the reinforcements (25), the heights of impact (h) between said through-openings and the pressure-side wall (16) or the facing suction-side wall (14) being greater than the air gap (30).

18 Claims, 3 Drawing Sheets

(52) U.S. Cl.
CPC .... *F05D 2230/22* (2013.01); *F05D 2250/141* (2013.01); *F05D 2250/241* (2013.01); *F05D 2250/711* (2013.01); *F05D 2250/712* (2013.01); *F05D 2260/201* (2013.01); *F05D 2260/202* (2013.01)

(58) Field of Classification Search
CPC .... F01D 9/041; F01D 25/12; F05D 2250/141; F05D 2250/241; F05D 2250/711; F05D 2250/612; F05D 2260/201; F05D 2230/22
USPC .......................................... 416/96 A; 165/908
See application file for complete search history.

(56) References Cited

U.S. PATENT DOCUMENTS

| | | | |
|---|---|---|---|
| 2010/0232946 A1* | 9/2010 | Propheter-Hinckley | F01D 5/189 415/177 |
| 2010/0247327 A1* | 9/2010 | Malecki | F01D 5/189 416/96 A |
| 2014/0105726 A1* | 4/2014 | Lee | F01D 5/188 415/115 |
| 2014/0290257 A1* | 10/2014 | Okita | F01D 5/189 60/752 |
| 2016/0023275 A1* | 1/2016 | Propheter-Hinckley | B22F 3/1055 416/96 A |
| 2016/0108755 A1* | 4/2016 | Carr | F01D 25/12 60/806 |
| 2016/0265774 A1* | 9/2016 | Cunha | F23R 3/06 |

FOREIGN PATENT DOCUMENTS

| | | |
|---|---|---|
| EP | 2228517 A2 | 9/2010 |
| EP | 2792850 A1 | 10/2014 |
| FR | 2998496 A1 | 5/2014 |

OTHER PUBLICATIONS

International Search Report and Written Opinion received for PCT Patent Application No. PCT/FR2016/051866, dated Oct. 31, 2016, 17 pages (8 pages of English Translation and 9 pages of Original Document).

International Preliminary Report on Patentability received for PCT Patent Application No. PCT/FR2016/051866, dated Feb. 1, 2018, 13 pages (7 pages of English Translation and 6 pages of Original Document).

\* cited by examiner

HIGH-PRESSURE DISTRIBUTOR BLADING HAVING A VARIABLE-GEOMETRY INSERT

FIELD OF THE INVENTION

The invention relates to the general field of single or double flow turbine engines, and more particularly to cooling blading of ventilated distributors.

TECHNOLOGICAL BACKGROUND

As shown in FIG. 5, a turbine engine 1 typically includes a nacelle or air inlet (plenum) which forms an opening for admitting a predetermined air flow toward the engine. Generally, the turbine engine comprises one or more compression sections 4 for the air admitted into the engine (generally a low-pressure section and a high-pressure section). The air thus compressed is admitted into the combustion chamber 5 and mixed with fuel before being burned there.

The hot combustion gases from this combustion are then expanded in different turbine stages 6, 7. A first expansion is performed in a high-pressure stage 6 immediately downstream of the chamber and which receives the gases at the highest temperature. The gases are again expanded while being guided through the so-called low-pressure turbine stages 7.

A high-pressure 6 or low-pressure 7 turbine, conventionally includes one or more stages, each consisting of a row of fixed turbine blading, also called a distributor 8 shown in FIG. 4, followed by a row of movable turbine blading spaced circumferentially all around the disk of the turbine. The distributor 8 deflects and accelerates the gas flow from the combustion chamber toward the movable turbine blading at an appropriate angle and speed so as to drive in rotation this movable blading and the turbine disk.

The distributor 8 comprises a plurality of blades distributed radially with respect to an axis of rotation X of the turbine engine connecting a radially inner annular element (or inner platform) and a radially outer annular element (or outer platform). The entirety forms an annular stream facing the movable turbine blading.

More precisely, the distributor 8 is formed of fixed blading disposed in a ring which can, if required, be divided into a plurality of segments distributed circumferentially around the axis X of the turbine engine. Each segment comprises one or more fixed adjacent bladings secured to a ring sector element as well as an upstream retention means and a downstream retention means. Here, upstream and downstream are defined by the gas flow direction in the turbine engine.

The distributor 8 bladings are generally obtained by casting and are made of a nickel-based superalloy or single crystal material which has very good thermal resistance.

The distributors 8 of the high-pressure turbines are parts exposed to very high thermal stresses. They are in effect placed at the outlet of the combustion chamber and therefore have extremely hot gases passing through them, which subject them to very strong thermal loads, the temperature of the gas at the combustion chamber outlet being considerably greater than the melting temperature of the materials constituting the distributor 8. The stream temperature at the inlet of the distributor 8 can in fact locally attain 2000° C., while it is not rare to observe serious damage at certain points of the part where the melting temperature is less than 1400° C.

In order to reduce the temperature of the part and limit its degradation, cooling of the distributors 8 is therefore necessary. Customarily, the function of cooling the distributors 8 is provided by one or more inserts placed inside the distributor 8 bladings. An insert is a hollow sheet-metal or cast part comprising cylindrical bores generally formed using a laser and assuming as well as possible the shape of the blading to be cooled. "Fresh" air collected at the compressor of the turbine engine impacts, through these bores, the inner face of the blading to cool it.

The inner face of the blading is thus cooled by these jet impacts and a forced convection phenomenon between the insert and the wall of the profile. The distance between the insert and the inner face of the blading, called the air gap, is therefore constant.

However, two phenomena control the cooling of the blading, namely jet impacts and forced convection between the insert and the inner face of the blading. One of the predominant parameters in the efficiency of cooling of these two modes is the value of the air gap. In fact, the air gap should be minimal if it is desired to maximize forced convection, but it must not be too small if it is desired to maximize the impact height of the jets (which corresponds to the distance between the outlet of a bore and the inner wall of the blading) so as to optimize the efficiency of the jet impacts.

Currently, the air gap being constant, a compromise is made regarding its value so as not to degrade too strongly the jet impacts to the benefit of effective forced convection.

The performance of a turbine engine is however connected in part to the ventilation system installed. In fact, all the air collection carried out to cool the components penalize the thermodynamic cycle of the turbine engine, degrade power and the specific fuel consumption of the engine. It is therefore necessary to limit to a strict necessary minimum the air collection. The efficiency of the cooling systems used is therefore paramount for the performance of the engine and the lifetime of the component concerned.

Document EP 2 228 517 describes distributor blading of a turbine engine, a blade and an insert housed in the blade in which openings are formed. The wall of the insert is further locally folded at the openings so as to cross their air jets and create turbulence.

Document EP 1 284 338 describes, for its part, distributor blading of a turbine engine, a blade and an insert housed in the blade in which openings are formed. The wall of the insert is discontinuous so as to form overlaps and modify the direction of impact of the air jets sent by the openings onto the inner face of the blade.

SUMMARY OF THE INVENTION

One objective of the invention is therefore to optimize the cooling of the distributor blading so as to limit the quantity of fresh air used, the final objective being the limitation of thermo-mechanical damage (cracks, burns, oxidation, etc.).

For this purpose, the invention proposes turbine engine distributor blading, said blading having:
- a blade comprising a pressure side wall and a suction side wall, and
- an insert housed between the pressure side wall and the suction side wall, the insert comprising:
  - a closed wall having an outer skin extending facing the pressure side wall and the suction side wall and an inner skin opposite to the outer skin, the outer skin of the closed wall and the facing wall of the blade being separated by an air gap, and
  - a series of through openings formed in the closed wall and extending between the outer skin and the inner skin.

The blading insert comprises a series of recesses of overall hemispheric, egghead or water drop shape, formed in the closed wall and leading to the outer skin. Moreover, the through openings are formed in said recesses and the impact heights between said through openings and the facing pressure side wall or suction side wall are greater than the air gap.

Certain preferred but not limiting features of the blading described above are the following, taken individually or in combination:
- the through openings have a periphery having a defined maximum width, a ratio between the impact height and the maximum width of all or a part of the through openings being comprised between 2.5 and 10, preferably between 2.5 and 7, more preferably between 2.5 and 5, typically between 2.8 and 3.2, for example equal to 3,
- the through openings are circular, the maximum width of said through openings corresponding to their diameter,
- the inner skin of the closed wall of the insert further comprises bulges, the through openings leading into said bulges,
- the impact height is comprised between 1.0 mm and 3.0 mm, preferably between 1 mm and 2 mm, typically between 1 mm and 1.5 mm,
- the air gap is comprised between 0.5 mm and 1.0 mm, preferably between 0.5 mm and 0.8 mm, and typically equal to 0.6 mm, and/or
- an inner face of the pressure side wall and of the suction side wall further comprises studs protruding from said inner face in the direction of the outer skin of the insert.

According to a second aspect, the invention also proposes a distributor for a turbine of a turbine engine comprising an inner annular platform and an outer annular platform, coaxial around an axis as well as a series of distributor bladings as described above, said bladings being circumferentially distributed around the axis between the inner platform and the outer platform.

According to a third aspect, the invention proposes a method for manufacturing a distributor blading as described above, wherein the insert is made by selective melting on a powder bed by a high-energy beam.

BRIEF DESCRIPTION OF THE DRAWINGS

Other features, aims and advantages of the present invention will be more apparent upon reading the detailed description that follows, and with reference to the appended drawings, given by way of non-limiting examples and in which.

DETAILED DESCRIPTION OF AN EMBODIMENT

Figure 5:
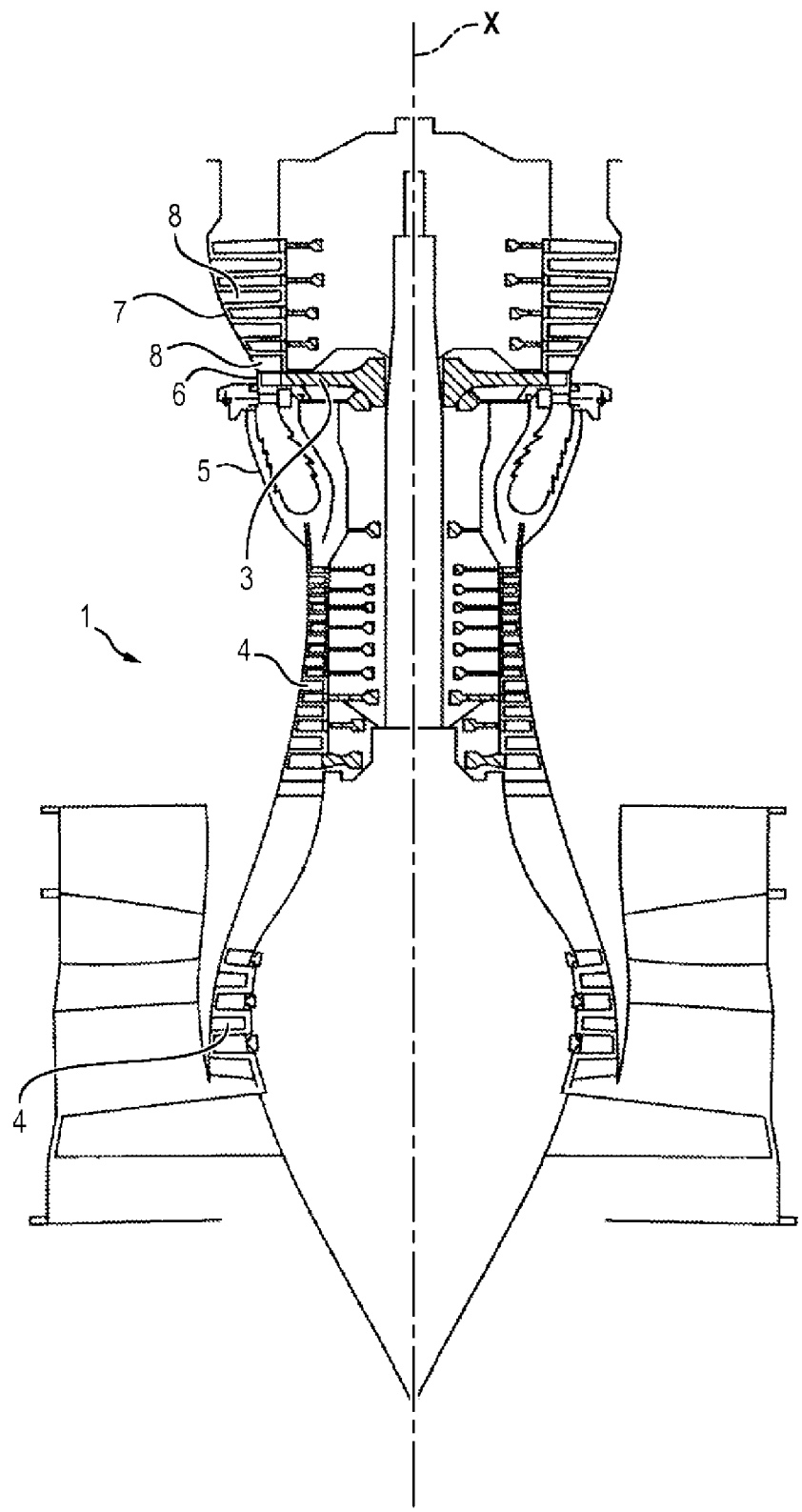

Referring first to FIG. 5, the invention will be described very particularly with reference to a single-stage high-pressure turbine 6, therefore comprising a high-pressure distributor 8 (or stator) and a movable wheel (or rotor). This is not limiting, however, in that the turbine 6 could include more stages and the invention can just as well apply to a low-pressure turbine 7 and to a compressor 4 (high or low-pressure), which also each comprise several fixed stages. Moreover, the distributor 8 can be in a single piece or divided into sectors.

Conventionally, the turbine 6 comprises one or more stages, each consisting of a distributor 8 followed by a row of movable turbine blades 3 spaced circumferentially all the way around the disk of the turbine 6.

Figure 4:
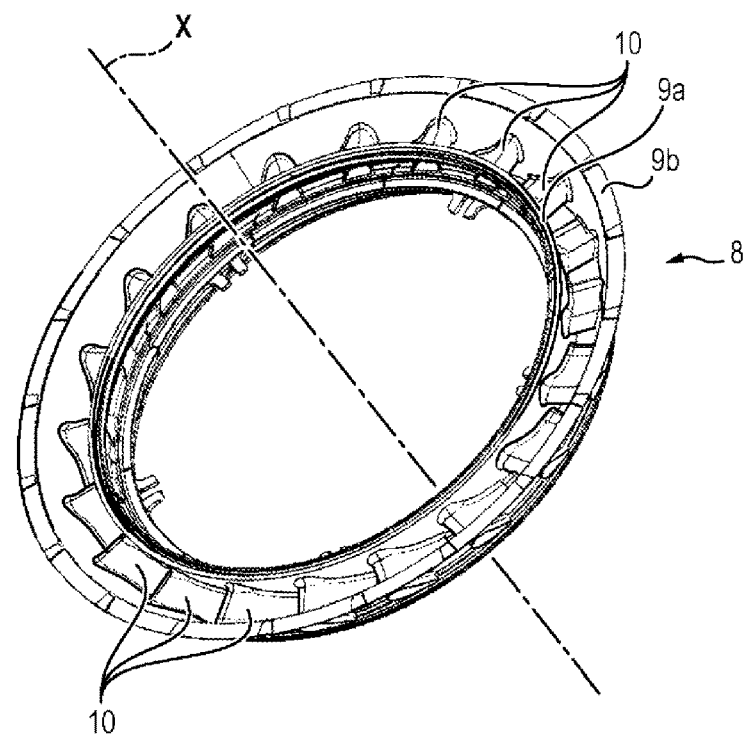
FIG. 4 is a perspective view of an exemplary embodiment of a distributor conforming to the invention and FIG. 5 is a simplified section view of a turbine engine comprising a distributor conforming to the invention.

The distributor 8 deflects the gas flow from the combustion chamber 5 toward the movable blades at an appropriate angle and speed so as to drive in rotation the blades and the disk of the turbine 6. As shown in FIG. 4, the distributor 8 comprises a plurality of fixed blades positioned radially with respect to the rotation axis X of the turbine engine 1 connecting a radially inner annular platform 9a and a radially outer annular platform 9b.

Every blading 10 comprises a blade 12 including a pressure side wall 16 and a suction side wall 14 interconnected by a leading edge 18 and a trailing edge 19. The leading edge 18 of a blade 12 corresponds to the anterior portion of its aerodynamic profile. It faces the gas flow and divides it into a pressure side air flow which runs along the pressure side wall 16, and a suction side air flow which runs along the suction side wall 14. The trailing edge 19, for its part, corresponds to the posterior portion of the aerodynamic profile, where the pressure side and suction side flows rejoin.

The distributor 8 further comprises a cooling system. To this end, and with reference to FIGS. 1-2, each blading 10 comprises an insert 20 housed in the blade 12 between the pressure side wall 16 and the suction side wall 14. The insert 20 comprises:
- a closed wall 12 having an outer skin 24 extending facing the pressure side wall 16 and the suction side wall 14, and an inner skin 26, opposite to the outer skin 24, the outer skin 24 of the closed wall 12 and the wall of the blading 10 facing it being separated by an air gap 30, and
- a series of through openings 28, formed in the closed wall 12 between the outer skin 24 and the inner skin 26.

A series of recesses 25, which lead to the outer skin 24, are further formed in the closed wall 12 of the insert 20. The through openings 28 are formed in the recesses 25 and the impact heights h, shown in FIG. 3, between the through openings 28 and the facing wall of the blade 12 are larger than the air gap 30.

Figure 3:
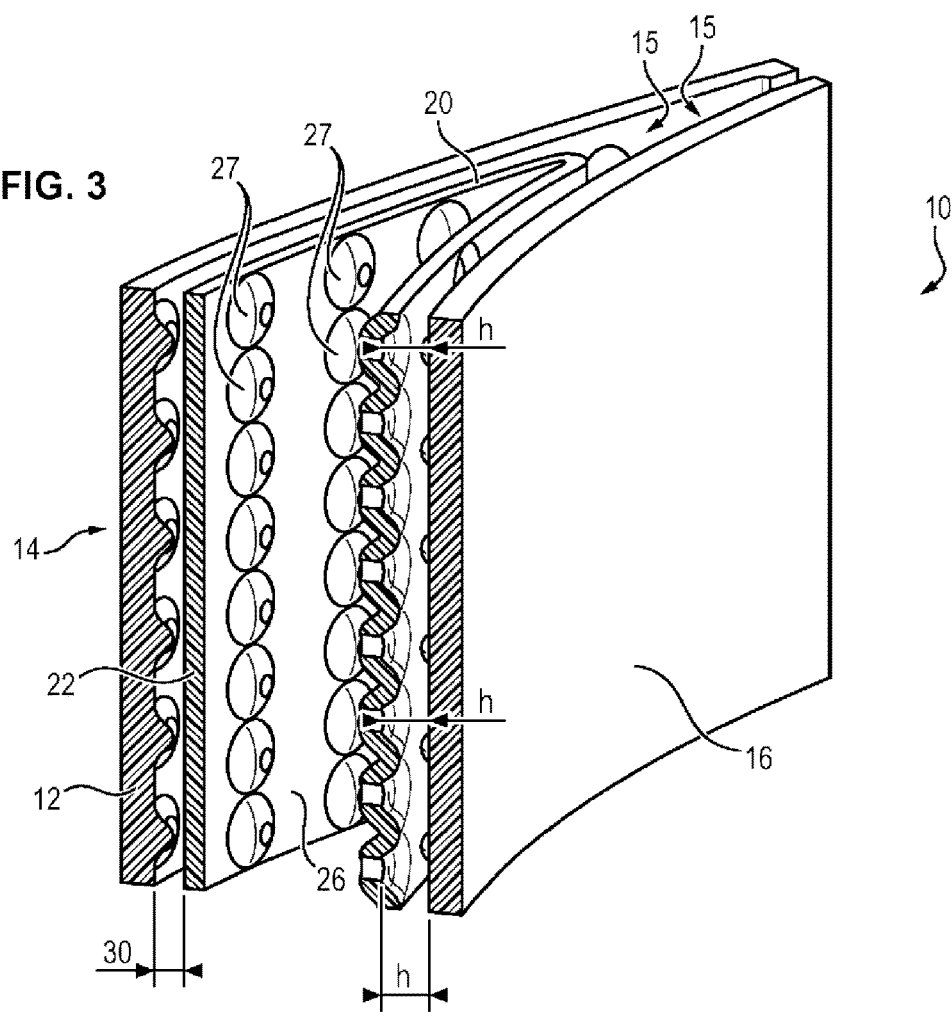
FIG. 3 is a partial view of an exemplary embodiment of distributor blading conforming to the invention.

With reference to FIGS. 3 and 4, one embodiment, the air gap can be constant. By air gap 30 is meant here the smallest distance between a point on the outer skin 24 of the closed wall 12 of the insert 20, around the recesses 25, and the facing wall of the blade 12, that is the pressure side wall 16 or the suction side wall 14. The air gap 30 is measured in a plane parallel to the tangent plane to the inner platform 9a at the root of the blade 12, and is constant overall between the inner platform 9a and the outer platform 9b.

By impact height h is meant the distance between the outlet (with respect to the cooling air flow) of the through opening 28 and the inner face 15 of the facing wall of the blade 12, that is the pressure side wall 16 or the suction side wall 14, along the axis X of cooling air flow into the through opening 28.

This configuration of the blading 10 allows both providing a small air gap 30 between the blade 12 and the insert 20, and thereby maintaining the efficiency of forced convection during discharge of the air after impact through the through openings 28, while still improving the efficiency of the impact thanks to the impact height h increased by the recesses 25 which offset the outlet of the through openings 28 with respect to the outer skin 24 of the insert 20.

In one embodiment, the impact height h is comprised between 1.0 mm and 3.0 mm, preferably between 1.0 and 2.0 mm, for example about 1.5 mm, when the air gap 30 is comprised between 0.5 and 1.0 mm, preferably between 0.5 and 0.8 mm, for example on the order of 0.6 mm.

Figure 1:
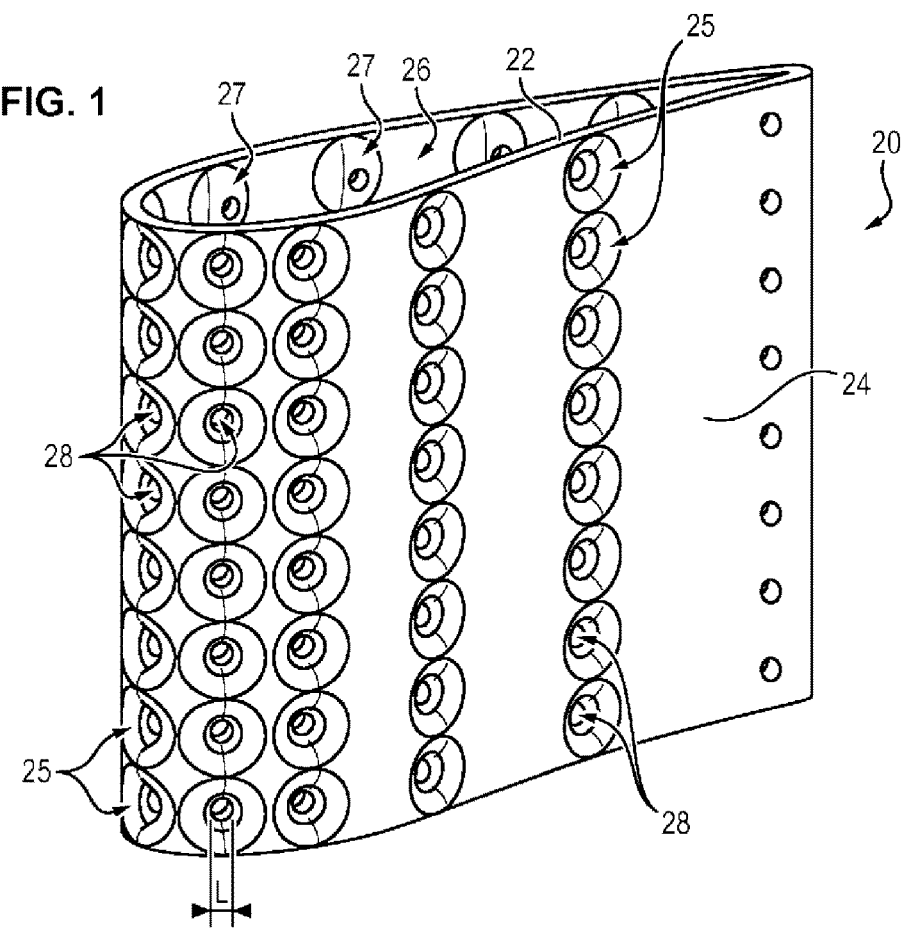
FIG. 1 is a perspective view of an exemplary embodiment of an insert of distributor blading conforming to the invention.

The through openings 28 have a periphery having a defined maximum width L shown in FIG. 1. By width L of periphery is meant here the distance between two parallel straight lines (or "support lines") which are tangent at two distinct points to the closed curve formed by the periphery of the through opening 28 at the recess. The maximum width L then corresponds to the greatest width L of the periphery. When a through opening 28 has a circular cross-section, the maximum width L is for example equal to the outside diameter of the circle. As a variant, the through opening 28 can have a square or rectangular cross-section, the maximum width L then corresponding to its diagonal.

In order to further optimize the efficiency of jet impact on the inner face 15 of the blade 12, the ratio between the impact height h and the maximum width L of all or a part of the openings is comprised between 2.5 and 10, preferably between 2.5 and 5, typically between 2.5 and 5, for example between 2.8 and 3.2. Typically, in the case of a blade 12 the closed wall 12 of which has a thickness comprised between 0.4 and 0.6 mm with an air gap 30 substantially equal to 0.6 mm, the optimal ratio between the impact height h and the maximum width L of the openings is on the order of 3. Such a ratio makes it possible in particular to obtain an impact distance of 1.5 mm.

As best seen in FIG. 1, the recesses 25 can have an overall hemispheric or "egghead" or water-drop shape. It will be noted that, depending on the impact height h desired and the thickness of the outer wall, the inner skin 26 of the insert 20 may not be flat.

Such a shape further allows such ratios of impact height h over maximum with L to be expected.

Figure 2:
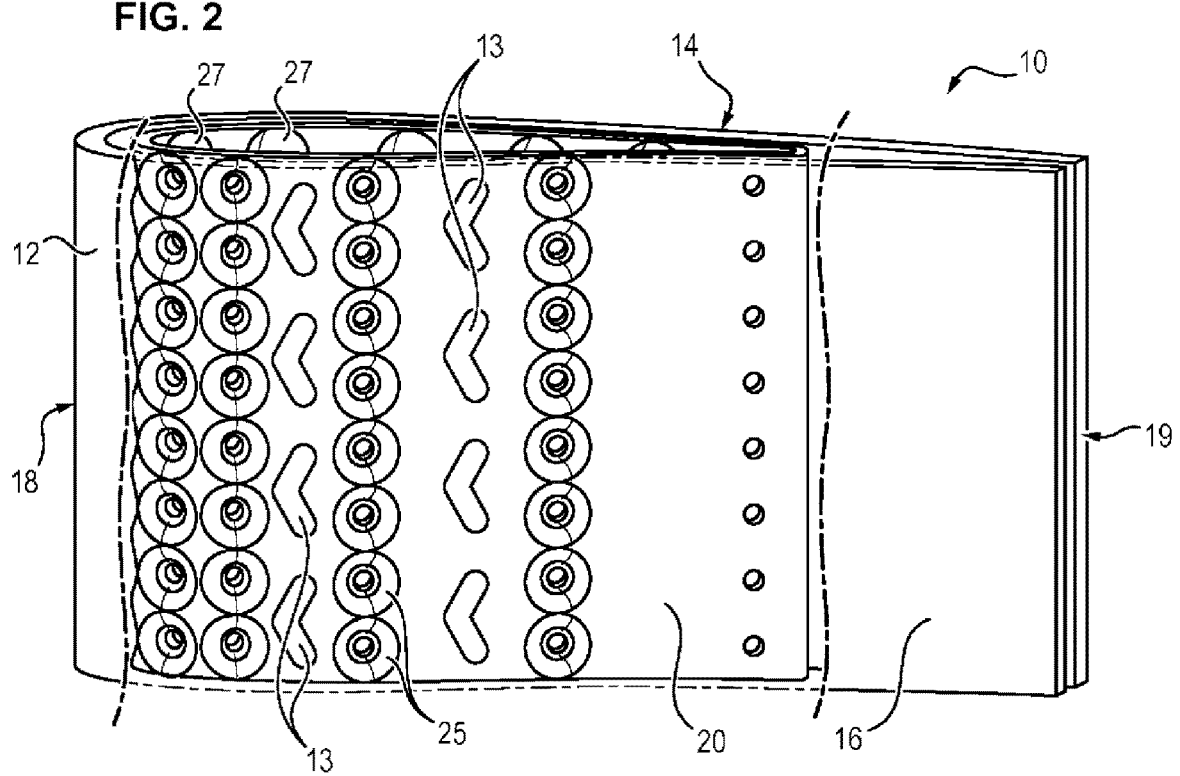
FIG. 2 is a side view of an exemplary embodiment of distributor blading conforming to the invention comprising the insert of FIG. 1, on which the insert is shown by transparency inside the blade.

Thus, in the exemplary embodiment illustrated in FIGS. 1 to 3, the air gap 30 is 0.6 mm, the closed wall of the blade 12 has a thickness on the order of 0.6 mm while the impact height h desired is 1.5 mm. The recesses 25 are thus obtained by modification of the geometry of the inner skin 26 and of the outer skin 24 of the closed wall 12, and not by forming a cavity in said outer wall. The inner skin 26 of the closed wall 12 is therefore not smooth and comprises bulges 27 corresponding to the recesses 25 formed in the outer skin 24. Here, the recesses 25 are hemispherical: the outer skin 24 of the closed wall 12 therefore has a series of hemispherical hollows at the bottom of which are made the through openings 28, while its inner skin 26 has hemispherical bulges 27 with a complementary shape and size which protrude from said inner skin 26, the through openings 28 leading from the peak of said bulges 27.

In a variant embodiment, the inner face 15 of the pressure side wall 14 and the suction side wall 16 of the blade 12 can comprise studs 13 protruding from said inner face 15 in the direction of the insert 20, so as to protect the jet impacting the inner face 15 of the blade 12 against shearing flow. The studs 13 can for example have a triangular or V cross-section overall, a tip of the cross-section extending in the direction of the leading edge 18 of the blade 12.

This variant embodiment, coupled with the optimum maximum L width L and impact height h, makes it possible to obtain effective and constant cooling and over the entire profile of the blade 12.

The configuration of the insert 20 and, if necessary, the provision of studs 13 on the inner face 15 of the blade 12, brings about a significant gain in the local impact efficiency of the distributor 8 cooling and the possibility of managing the efficiency of forced convection in the air gap 30 which still limiting the shear of the downstream rows of impacts by those located further upstream. The optimization of all these parameters further allows the best use of the air used for cooling the wall. At iso-flow rate, this allows it to be more effective thermally (lifetime gain) or to reduce the flow rate to iso-thermal efficiency, which translates into a gain in performance of the engine.

The blade 12 can be obtained conventionally, for example by casting in a suitable material such as a nickel-based superalloy or single crystal material which has good thermal resistance. As a variant, the blade 12 can be obtained by selective melting on a powder bed by a high-energy beam.

The insert for its part can for example be obtained by casting or by selective melting on a powder bed by a high-energy beam. Selective melting on a powder bed by a high-energy beam allows in particular obtaining an insert for a lower cost (in comparison with casting), creating recesses 25 (and if necessary bulges 27) of suitable form. The outer wall of the insert can then have a thickness comprised between 0.4 and 0.8 mm, for example about 0.6 mm, or even 0.4 mm.

The invention claimed is:

1. A turbine engine distributor blading, comprising:
   a blade comprising a pressure side wall and a suction side wall, wherein an inner surface of the pressure side wall and an inner surface of the suction side wall define an opening of the blade; and
   an insert housed within the opening of the blade, the insert comprising:
   a closed wall having an outer surface and an inner surface opposite to the outer surface, wherein a first portion of the outer surface of the closed wall faces the pressure side wall and wherein a second portion of the outer surface of the closed wall faces the suction side wall, wherein a first air gap separates the first portion of the outer surface of the closed wall and the inner surface of the pressure side wall and a second air gap separates the second portion of the outer surface of the closed wall and the inner surface of the suction sidewall wall, wherein a first air gap distance is measured between the first portion of the outer surface of the closed wall and the inner surface of the pressure side wall and a second air gap distance is measured between the second portion of the outer surface of the closed wall and the inner surface of the suction side wall;
   a series of recesses, wherein each recess is defined by a concave portion of the outer surface of the closed wall, wherein each recess is concave such that each recess of the series of recesses is hemispherical in shape; and
   a series of through openings, wherein each recess of the series of recesses comprises a through opening of the series of through openings, the through openings extending between the concave portion of the outer surface of the closed wall within the respective recess and the inner surface of the closed wall, wherein an impact height is measured between an outlet of the through opening within the respective recess and the inner surface of the blade that faces the respective recess, the impact height being greater than each of the first and second air gap distances.

2. The blading according to claim 1, wherein the through openings have a periphery defining a maximum width, a ratio between the impact height and the maximum width of the through openings being between 2.5 and 10.

3. The blading according to claim 2, wherein the through openings are circular in cross-section such that the maximum width of the through openings corresponds to a diameter of the through openings.

4. The blading according to claim 2, wherein the ratio between the impact height and the maximum width of the through openings is between 2.5 and 7.

5. The blading according to claim 2, wherein the ratio between the impact height and the maximum width of the through openings is between 2.5 and 5.

6. The blading according to claim 2, wherein the ratio between the impact height and the maximum width of the through openings is between 2.8 and 3.2.

7. The blading according to claim 2, wherein the ratio between the impact height and the maximum width of the through openings is equal to 3.

8. The blading according to claim 1, wherein the inner surface of the closed wall of the insert comprises a plurality of protrusions, each protrusion defined by a convex, inner surface of the closed wall, wherein the convex, inner surface is hemispherical in shape.

9. The blading according to claim 1, wherein the impact height is between 1.0 mm and 3.0 mm.

10. The blading according to claim 9, wherein the impact height is between 1 mm and 2 mm.

11. The blading according to claim 9, wherein the impact height is between 1 mm and 1.5 mm.

12. The blading according to claim 1, wherein the first air gap distance and the second air gap distance are between 0.5 mm and 1.0 mm.

13. The blading according to claim 12, wherein the first air gap distance and the second air gap distance between 0.5 mm and 0.8 mm.

14. The blading according to claim 12, wherein the first air gap distance and the second air gap distance are equal to 0.6 mm.

15. The blading according to claim 1, wherein each of the inner surface of the pressure side wall and the inner surface of the suction side wall comprises studs protruding therefrom in the direction of the outer surface of the closed wall of the insert.

16. A turbine engine distributor comprising an inner annular platform and an outer annular platform, coaxial around an axis of the distributor,
wherein the distributor comprises a plurality of the turbine engine distributor bladings according to claim 1 circumferentially distributed around the axis between the inner platform and the outer platform.

17. A method for manufacturing the turbine engine distributor blading according to claim 1, wherein the insert is made by selective melting on a powder bed by a high-energy beam.

18. The blading according to claim 1, wherein:
the inner surface of the closed wall of the insert comprises a plurality of protrusions, each protrusion defined by a convex, inner surface of the closed wall, wherein the convex, inner surface is hemispherical in shape; and
the through opening extends between the convex, inner surface of the closed wall and the concave, outer surface of the closed wall.

* * * * *